Aug. 23, 1966  M. B. MELILLO  3,268,353
ELECTROLESS DEPOSITION AND METHOD OF PRODUCING SUCH
ELECTROLESS DEPOSITION
Filed Nov. 18, 1960

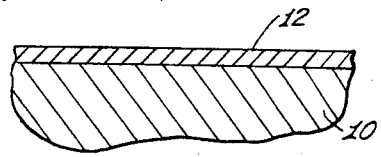

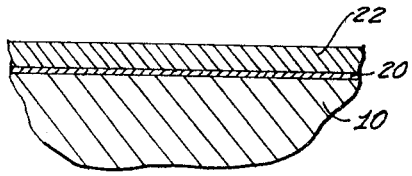

Fig.3

| Material | Grams per Liter |
|---|---|
| Nickel Sulfate $NiSO_4 \cdot 6H_2O$ | 30 |
| Cobalt Sulfate $CoSO_4 \cdot 7H_2O$ | 60 |
| Sodium Hypophosphite $NaH_2PO_2 \cdot H_2O$ | 10 |
| Sodium Citrate $Na_3C_6H_5O_7 \cdot 2H_2O$ | 80 |
| Sodium Potassium Tartrate $NaKC_4H_4O_6 \cdot 4H_2O$ | 40 |
| Urea $CO(NH_2)_2$ | 10 |
| Hydrazine $NH_2NH_2$ as req'd. for pH 8 to 10 | |
| Lauryl Sulfate (Wetting agent as required) | |

Fig.4

| Material | Grams per Liter Representative Plating Baths |
|---|---|
| Nickel Acetate $Ni(C_2H_3O_2)_2 \cdot 4H_2O$ | 30 |
| Urea $CO(NH_2)_2$ | 10 |
| Sodium Hypophosphite $NaH_2PO_2 \cdot H_2O$ | 10 |
| Sod. Potassium Tart. $NaKC_4H_4O_6 \cdot 4H_2O$ | 40 |
| Ferrous Sulfate $FeSO_4 \cdot 7H_2O$ | 15 |
| Ammonium Hydroxide $NH_4OH$ as req'd. for pH 8 to 10 | |
| Sodium Citrate $Na_3C_6H_5O_7 \cdot 2H_2O$ | 80 |

INVENTOR.
Manlio B. Melillo

By Smyth, Rostow & Pavitt
Attorneys

United States Patent Office 3,268,353
Patented August 23, 1966

3,268,353
ELECTROLESS DEPOSITION AND METHOD OF PRODUCING SUCH ELECTROLESS DEPOSITION
Manlio B. Melillo, Inglewood, Calif., assignor to The Electrada Corporation, Culver City, Calif., a corporation of Delaware
Filed Nov. 18, 1960, Ser. No. 70,307
16 Claims. (Cl. 117—47)

This invention relates to articles produced by the electroless deposition of metals on a surface, and more particularly relates to magnetic depositions which become disposed on a metallic surface by electroless techniques. The invention is especially concerned with the production of magnetic depositions on a surface with enhanced magnetic properties because of the deposition of a first layer provided with enhanced magnetic properties in comparition different from that of the first layer. The invention also relates to methods of producing such articles of manufacture, and particularly to methods of producing magnetic depositions with enhanced magnetic characteristics.

The electroless deposition of such materials as cobalt and nickel on a surface has been known for a considerable number of years. Such electroless deposition was first performed by Abner Brenner to provide a coating of nickel on a surface such as steel or aluminum to prevent such surface from corroding. Thereafter, a considerable amount of work was performed to produce electroless depositions having magnetic properties.

In an electroless process, the material to be deposited is included as ions in a chemical bath with other materials. These other materials react with the ions to obtain the conversion of the ions into molecules and to obtain the deposition of the molecules on a surface which is subjected to the chemical bath. Such a chemical bath is advantageous since it does not require the production of electrical poles to attract or repel ions in the bath in accordance with the charge of the ions and the charge of the poles. By eliminating the need for electrical poles, the plating of materials has been simplified and rendered relatively inexpensive. Furthermore, the plating process can be controlled so that relatively thin layers of a material in the order of thousandths of an inch of thickness can be deposited with some precision and uniformity on a surface.

Although a considerable amount of developmental work has been performed in producing magnetic depositions by electroless techniques, such work has not been entirely successful. One reason has been that the magnetic material is not deposited uniformly and with a firm bond to the surface receiving the deposition. Another reason has been that the magnetic deposition has not had as good magnetic properties as would normally be desired. For example, none of the magnetic depositions obtained by electroless techniques has included iron to any appreciable extent. The deposition of iron is desirable, since it tends to enhance the magnetic properties of the magnetic material, especially when it is used in combination with other materials such as nickel and cobalt in certain percentages.

This invention relates to magnetic depositions which overcome the above disadvantages. The magnetic depositions constituting this invention are deposited uniformly and firmly to the surface receiving the depositions and are provided with enhanced mangetic properties in comparison to the properties obtained previously. Such desirable properties are obtained from magnetic depositions constituting this invention by initially depositing a first layer of magnetic material including iron on the surface receiving the deposition, and by subsequently depositing on the first layer of magnetic material a second layer of magnetic material having a composition different from that of the first layer. The second layer of magnetic material is deposited with a thickness considerably greater than the first layer.

The production of desirable magnetic properties for the first and second layers of magnetic material is facilitated by the inclusion of urea in the plating bath with ions of the magnetic materials which are to be deposited. It will be appreciated from the subsequent discussion that the use of urea constitutes a novel aspect of the invention in itself and may be used to obtain a deposition of only a single layer of magnetic material as well as to obtain a deposition of first and second distinct layers of magnetic material.

In the drawings:
FIGURE 1 is a fragmentary sectional view of a magnetic member formed by a deposition of a single layer of magnetic materials on a suitable surface such as a metallic surface;
FIGURE 2 is a fragmentary sectional view of a magnetic member formed by a deposition of two different magnetic materials on a surface, one magnetic material being initially deposited on the surface and the second magnetic material being subsequently deposited on the first magnetic material;
FIGURE 3 is a table illustrating a plating bath which has been used to produce the magnetic member illustrated in FIGURE 1; and
FIGURE 4 is a table illustrating a plating bath which has been used to produce one of the layers in the magnetic member illustrated in FIGURE 2.

The magnetic member illustrated in FIGURE 1 is preferably formed from a metallic base member 10 such as aluminum. By way of illustration, the base member 10 may be provided with a cylindrical configuration so that a magnetic transducer head (not shown) can be disposed in contiguous relationship to a flat or annular surface of the cylinder. By providing such a contiguous relationship, information in the form of signals can be transferred between the head and successive positions in the annular direction along the contiguous surface of the cylinder.

When a metal such as aluminum is used as the base member 10, the base member is first coated with a suitable material such as copper. The copper is applied to the surface of the aluminum by a technique known as a "copper flash". This technique involves the use of an electrolytic process wherein the copper constitutes one electrical pole and wherein the ions of copper become transferred from that electrolytic pole to the surface of the base member 10 by the flow of an electrical current.

After the copper flash has been applied to the surface of the base member 10, the surface is degreased. This may be accomplished in a number of different ways. One preferential method is to apply tri-chlorethylene at room temperature (70° F.) or slightly above room temperature to the surface of the metal for a suitable period of time, such as one or two minutes. The surface of the metal is then rinsed in water to remove the trichlorethylene from the metallic surface. The surface of the base member 10 may also be dried by subjecting the surface to a blast of hot air.

The copper-flashed surface of the base member 10 may then be further degreased as by applying commercial alkali to the surface at room temperature of (70° F.) or slightly above room temperature. Such commercial alkali may be formed from sodium hydroxide (NaOH) mixed in water to have a concentration of approximately 5% by weight. A material designated by the trade mark "Oakite" may also be used.

After the copper-flashed surface of the base member 10 has been treated in the manner set forth above, the surface is immersed in a solution of nitric acid (HNO₃) until an etching of the surface is obtained. Preferably the concentration of the nitric acid in the solution is less than 25%. The copper-flashed surface of the base member 10 is immersed in the solution of nitric acid until the copper surface changes to a color which is more pale than its previous color. This may result from the removal of the first molecular layer on the copper surface to increase the chemical activity of the newly exposed layer.

A test may be made as to the operation of the nitric acid in removing the molecular layer of copper in every portion along the surface of the copper. This test may be made by running water over the newly exposed surface of the copper. If the water runs over the surface of the copper without any breaks, the removal of grease at every portion of the surface of the copper is indicated.

After the copper-flashed surface of the base member 10 is treated with the solution of nitric acid, the surface is rinsed in water to remove the nitric acid. The copper-flashed surface of the base member 10 is then treated with a solution of palladium ions. This solution may be obtained by mixing approximately 0.1 gram of palladium chloride (PdCl₂) per liter of water and adding a sufficient amount of hydrochloric acid to obtain a pH between 3 and 4, preferably in the order of 3.5. The resulting solution is heated to approximately 70° C. and the copper flashed surface of the base member 10 is immersed in the heated solution for approximately one minute. The surface of the copper then becomes covered with a grayish-blue layer of palladium as a result of the replacement of the copper ions by the palladium ions.

It will be appreciated that the time of immersion of the copper-flashed surface of the base member 10 in the palladium solution may be varied by changing the temperature of the solution. The palladium-treated surface of the base member 10 may be rinsed lightly or may be immersed directly in the plating bath, which will be described in detail subsequently. The deposit of palladium on the copper-flashed surface of the base member 10 acts as a catalyst in obtaining the deposition of magnetic materials such as iron, nickel and cobalt on this surface.

After the copper-flashed surface of the base member 10 has been treated in a palladium solution as discussed above, the surface of the base member 10 is subjected to a plating bath. This bath contains certain ingredients including magnetic materials to obtain the deposition of the magnetic materials on the prepared surface of the base member 10. For example, the bath includes ions of certain magnetic materials such as the ions of nickel and cobalt to obtain the deposition of the nickel and cobalt on the prepared surface of the base member 10. The nickel and cobalt may be obtained from suitable salts such as nickel sulfate (NiSO₄.6H₂O) and cobalt sulfate (CoSO₄.7H₂O). The nickel ions are preferably in the nickelous form.

A suitable material is also included in the bath to reduce the ions of the magnetic materials, such as nickel and cobalt, to molecules for deposition of the molecules of the magnetic materials on the prepared surface of the base member 10. Preferably this reducing agent is a hypophosphite such as sodium hypophosphite (NaH₂PO₂.H₂O)

but other reducing agents may also be used.

Complexing agents are also included in the bath to prevent hydroxides of the metals such as the hydroxides of nickel and cobalt from precipitating out of the bath. Because of the action of the complexing agents, the nickel and cobalt ions are retained in the solution for reaction with the reducing agent such as the hypophosphite to obtain a deposition of molecules of nickel and cobalt on the prepared surface of the base member 20.

The tartrate and citrate ions have been used successfully as complexing agents. The tartrate ion may be in the form of sodium potassium tartrate (NaKC₄H₄O₆.4H₂O)

and the citrate ion may be in the form of sodium citrate (Na₃C₆H₅O₇.2H₂O). Sodium potassium tartrate is well known and commercially available as Rochelle salt. As will be apparent, both the tartrate and citrate ions constitute the negative ions of weak acids.

A buffer is also included to maintain the pH of the plating bath within certain desired limits. For example, hydrazine (NH₂NH₂) may be added as required to the bath to maintain the pH of the bath within certain limits such as within a range of 8 to 10. Ammonium hydroxide (NH₄OH) may also be used but it does not react quite as rapidly as hydrazine. The complexing agents may also be at least partially effective in preventing the pH of the plating bath from changing rapidly. The temperature of the bath is also maintained within particular limits such as a range of 158° F. to 194° F. corresponding to 70° C. to 90° C.

In addition to the above materials in the plating bath, urea [CO(NH₂)₂—] is also included in the bath as an important feature of the invention. The urea operates as a sequestering agent to stabilize the metallic ions having the lowest valence state, such as the nickelous state. It has been found that the urea causes a deposition to be produced on the surface of the base member 10 wherein the deposition is more uniform, more firmly bonded and more desirable magnetically then the depositions previously obtained without the use of urea. For example, it has been found that the urea causes the magnetic deposition to provide hysteresis characteristics which are more rectangular and which provide higher flux levels than those previously obtained. A material has rectangular hysteresis characteristics when the coercive force varying the magnetic state of the material remains substantially constant during the time that the magnetic material is being driven from a magnetic saturation of one polarity to a magnetic saturation of an opposite polarity.

When urea is used as a sequestering agent for the nickel ions in the plating bath, the urea may react with the nickel ions in the following manner:

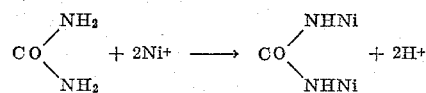

Since the nickel now becomes bound into the urea molecules, the nickel cannot react with the hydrazine to produce nickel hydroxide, which would precipitate. It will be appreciated, however, that the particular action of the urea in obtaining a deposition of the nickel on the prepared surface of the base member 10 is not entirely certain although the theory set forth above seems quite plausible. It will also be appreciated that the complexing agents such as the tartrate and citrate radicals may also be partially effective in preventing the nickel from precipitating out of the plating bath as nickel hydroxide, especially when the complexing agents are combined with the urea. At any rate, the inclusion of the urea is effective in enhancing the magnetic properties of the magnetic material which is deposited on the prepared surface of the base member 10. The magnetic material deposited on the base member 10 is indicated at 12 in FIGURE 1 and a representative bath for obtaining such a deposition is illustrated in FIGURE 3.

As Brenner has indicated in his papers relating to electroless depositions, the reactions of the various materials with nickel in the plating bath are as follows:

NiSO₄.6H₂O+NaH₂PO₂→Ni+H₂SO₄+NaH₂PO₃+5H₂O

By analogy, the reaction of the various materials with cobalt in the plating bath is as follows:

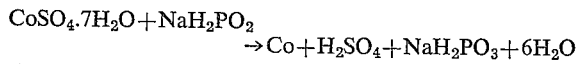

Since acids are produced by the reactions set forth above, they have to be neutralized by the addition of hydrazine to maintain the pH of the plating bath within the desired limits of 8 to 10.

It has been found that the magnetic characteristics of the depositions obtained from the plating baths constituting this invention can be further enhanced by sequentially depositing two layers of magnetic material, each different from the other. The first layer includes iron and an additional magnetic material such as nickel, cobalt or manganese. The first layer is indicated at 20 in FIGURE 2 and is applied with a thickness considerably less than that of the second layer. For example, the first layer may have a thickness in the order of 0.0001 inch and the second layer may have a thickness in the order of 0.001 inch to 0.002 inch, the second layer being indicated at 22 in FIGURE 2. The second layer may be formed from suitable magnetic materials such as nickel and cobalt. A suitable plating bath for producing the first layer 20 of magnetic material is set forth in FIGURE 4 but other baths may also be used, as may be seen from copending application Serial No. 70,224 filed by me on the same date as this application.

The reasons for obtaining enhanced magnetic characteristics by the deposition of two different layers of magnetic material are not certain but certain explanations appear to be pluasible. Since the first layer 20 of magnetic material includes iron as one of the elements, the first layer of magnetic material has more desirable magnetic characteristics than the second layer 22 of magnetic material, especially with respect to magnetic retentivity. This causes the first layer 20 to act effectively as a permanent magnet in retaining magnetic information, so that the travel of flux through the first and second layers becomes facilitated. By sequentially depositing the first and second layers 20 and 22, the packing of magnetic information on the surface of a drum has occurred at a density in the order of almost 500 bits per inch as contrasted with a density of approximately 100 bits per inch by prior techniques.

As previously described, iron is preferably included as one of the magnetic materials in the first layer 20 when first and second layers of different magnetic material are sequentially deposited on the prepared surface of the base member 10. The iron is preferably deposited in certain percentages of the total amount of magnetic material in the first layer 20. For example, the iron may be deposited in the ratio of approximately twenty percent (20%) by weight and nickel may be deposited in the ratio of eighty percent (80%) by weight. Such a deposition is desirable because it has a composition similar to that designated by the trade mark "Permalloy." This composition is known to exhibit a hysteresis loop with substantially rectangular characteristics.

As will be seen from FIGURE 4, urea is included as a sequestering agent in the plating bath for the first layer 20 of magnetic material when iron is deposited as one of the magnetic materials. The urea probably reacts with the iron in a manner similar to that set forth below:

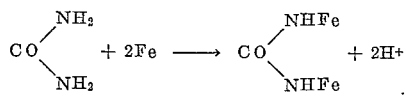

Such a reaction occurs with the iron in the ferrous state and prevents the iron from becoming precipitated in the form of iron hydroxide. The deposition of a magnetic material including iron by electroless techniques is fully set forth in copending application Serial No. 70,224 filed by me on the same date as the filing of this application.

It will be appreciated that other materials than nickel may be used in the plating bath with the iron ions to obtain the first layer 20 of magnetic deposition. For example, the nickel salt in the plating bath may be replaced by an equivalent amount of the cobalt salt to obtain a cobalt-iron deposition. Such depositions may be desired under certain circumstances. By way of further illustration, depositions of nickel, cobalt and iron may also be produced for certain special purposes, and depositions including manganese with iron and other magnetic materials may also be produced.

The depositions produced by this invention are especially advantageous since they are applied in a chemically and physically adherent relationship to the prepared surface of the base member 10. This base member is preferably metallic but also may be non-metallic, especially when two separate layers of magnetic material are applied to the prepared surface of the base member, as illustrated in FIGURE 2. For example, certain non-metallic base members such as cellulose acetates or polyesters may also be used. The polyesters have been designated by the trade mark "Mylar" by E. I. du Pont de Nemours of Wilmington, Delaware.

Magnetic members constituting this invention and produced by the electroless techniques included in this invention are advantageous for certain important reasons. For example, the magnetic materials are retained on the base member even when subjected to friction from an adjacent magnetic head as the magnetic member moves past the head. Furthermore, the magnetic materials do not tend to wear the head by friction as the magnetic member moves past the head. Because of these advantages, the magnetic member and the head can be disposed in contacting relationship so that the signal-to-noise ratio of the magnetic information recorded on the magnetic member and subsequently reproduced from the magnetic member becomes considerably enhanced.

The thickness of the magnetic deposition on the prepared surface of the base member 10 is dependent upon the magnetic characteristics desired. For example, the rectangular characteristics of the hysteresis loop tend to increase with decreases in the thickness of the magnetic deposition on the prepared surface of the base member 10. The thickness of the magnetic deposition on the prepared surface of the base member 10 is also dependent upon the parameters of the plating bath, such parameters including the temperature of the plating bath and the time of application of the plating bath to the prepared surface. For example, the thickness of the deposition initially increases at a rate of approximately 0.2 to 0.3 mils per hour at a temperature of approximately 70° C. for the plating bath. Similarly, the thickness of the deposition initially increases at a rate of approximately 1.0 to 1.5 mils per hour at a temperature of approximately 90° C. Furthermore, the rate of deposition increases with the size of the bath and upon the agitation of the bath. It will be appreciated that the rate of deposition tends to increase somewhat as the plating bath continues to be applied to the prepared surface such as the surface of a magnetic drum.

Although this application has been disclosed and illustrated with reference to particular applications, the principles involved are susceptible of numerous other applications which will be apparent to persons skilled in the art. The invention is, therefore, to be limited only as indicated by the scope of the appended claims.

I claim:

1. In a method of electrolessly depositing magnetic materials on a surface, the steps of:
   cleaning the surface;
   subjecting the surface to a solution containing ions of palladium to obtain a deposit of the palladium on the surface;
   disposing the surface in a first bath including ferrous ions and including ions of an additional element from a group consisting of cobalt and nickel where the additional element has magnetic properties when deposited with iron, and including urea, sodium hypophosphite and a complexing agent from a group consisting of citrates and tartrates for a sufficient period of time to obtain a uniform deposition of a first thin layer of a first magnetic material on the surface; and disposing the surface containing the first magnetic layer in a second bath including ions of at least one magnetic element from the group consisting of nickel and cobalt, sodium hypophosphite and a complexing agent from the group consisting of citrates and tartrates for a sufficient period of time to obtain a deposition of a second magnetic material different from the first magnetic material in a second layer on the first layer and to obtain the deposition of the second layer with a considerably greater thickness than the first layer, the second magnetic layer having a different chemical composition than the first magnetic layer.

2. The method set forth in claim 1 in which buffers are included in the first and second plating baths to maintain the pH of the first and second plating baths within a range of approximately 8 to 10.

3. The method set forth in claim 2 in which the urea in the first bath is provided with a weight of approximately 10 grams per liter, in which the sodium hypophosphite in the first and second baths is provided with the weight of approximately 10 grams per liter and in which the complexing agent in the first and second baths is provided with a weight of approximately 40 to 80 grams per liter and are obtained from the group consisting of citrates and tartrates and wherein hydroxyl ions obtained from ammonium hydroxide serve as the buffer.

4. A magnetic member, including,
a base member having a particular surface with substantially uniform characteristics,
a layer of palladium disposed on the particular surface of the base member,
a first deposition disposed directly on the layer of palladium on the base member and having a uniform thickness and including molecules of iron and molecules of an additional element from a group consisting of cobalt and nickel where the additional element has magnetic properties when included with iron, and
a second deposition disposed on the first deposition and having a uniform thickness and including molecules of at least one magnetic element from the group consisting of cobalt and nickel and having a different composition than the first deposition.

5. A magnetic member, including,
a base member having a particular surface with substantially uniform characteristics,
a layer of palladium disposed on the particular surface of the base member,
a first thin layer of magnetic material directly bonded on the layer of palladium on the base member and having a uniform thickness and including a substantial proportion of iron molecules and molecules of an even larger proportion of an additional element from a group consisting of nickel and cobalt where the additional element has magnetic properties when included with iron, and
a second thin layer of magnetic material bonded on the first thin layer and having a uniform thickness and including molecules of at least one magnetic element from the group consisting of nickel and cobalt and having a different composition than that of the first layer.

6. The magnetic member set forth in claim 5 in which the second thin layer is considerably thicker than the thin layer.

7. The magnetic member set forth in claim 5 in which the proportion of iron to the additional magnetic element is in the order of 1:4 and in which the thickness of the first magnetic layer is approximately 0.0001 inch and in which the thickness of the second magnetic layer is in the order of 0.001 to 0.002 inch.

8. In a method of electrolessly depositing magnetic material on a surface, the steps of:
cleaning the surface for the deposition of the magnetic material,
sensitizing the surface by disposing the surface in a bath containing ions of palladium,
disposing all of the sensitized surface in a first bath including ions of iron and ions of a second element from a group consisting of nickel and cobalt where the second element has magnetic properties when included with iron, including a complexing agent to prevent the precipitation of the second element from the bath and including urea as a sequestering agent for a sufficient period of time to prevent the precipitation of the iron from the bath and to provide for a controlled deposition of the entire prepared surface of the iron and the second element in a first thin layer, and
applying to the prepared surface a second bath including ions of a particular magnetic element from the group consisting of cobalt and nickel and a complexing agent for a particular period of time to provide for a controlled deposition of the particular magnetic element in a second thin layer on the entire surface of the first magnetic layer and with a composition different from that of the first thin layer.

9. The method set forth in claim 8 in which the second magnetic layer has a considerably greater thickness than the first magnetic layer.

10. The method set forth in claim 8 wherein the complexing agent in the first and second baths is obtained from the group consisting of tartrate and citrate ions and wherein the surface receiving the magnetic deposition is a metal and wherein hypophosphite ions are included in the first and second baths to serve as reducing agents.

11. The method set forth in claim 10 wherein the first magnetic layer is provided with a thickness in the order of 0.0001 inch and wherein the second magnetic layer is provided with a thickness in the order of 0.001 to 0.002 inch.

12. A method of electrolessly depositing magnetic materials on a metallic surface, including the steps of:
cleaning the metallic surface;
etching the cleaned metallic surface to prepare the metallic surface chemically for the deposition of the magnetic materials;
sensitizing the surface by disposing the surface in a bath containing ions of palladium; and
disposing the sensitized surface in a first bath including ions of iron and ions of a second element from a group consisting of nickel and cobalt where the second element has magnetic proportions when included with iron, including urea, including a reducing agent to reduce the ions of iron and the second element to molecules for the deposition of the molecules on the prepared surface, and a complexing agent to prevent the precipitation of the second element from the bath, the bath being applied for a first length of time to obtain a thin layer of iron and the second element on the metallic surface, and subsequently disposing the prepared surface in a second bath including ions of at least one magnetic element from the group consisting of cobalt and nickel to produce a deposition of increased thickness relative to that applied by the first bath, the second bath including a reducing agent to reduce the ions of the magnetic element in the second bath to molecules for the deposition of the molecules on the prepared surface in a second thin layer and further including a complexing agent for a sufficient length of time to prevent the precipitation of the ions of the magnetic element from the bath, the second bath having a different concentration of magnetic materials by weight than the first bath to obtain a different composition for the second thin layer than for the first thin layer.

13. A magnetic member, including,
a base member having a first surface uniformly prepared in a particular manner for the reception of a deposition,
a thin layer of palladium deposited on the first surface of the metallic base member,
a first thin layer of magnetic material deposited in a uniform layer on the thin layer of palladium on the base member in directly bonded relationship to the thin layer of palladium and including a substantial proportion of iron molecules and molecules of a considerably increased proportion of an additional element from a group consisting of nickel and cobalt where the second element has magnetic properties when included with the iron, and
a second thin layer of magnetic material deposited in a uniform layer directly on the first layer of magnetic material in bonded relationship to the first layer of the base member with a thickness considerably greater than the first layer and including molecules of at least one magnetic element from the group consisting of nickel and cobalt, the second magnetic layer having a different chemical composition than that of the first layer.

14. The magnetic member set forth in claim 13 wherein the first magnetic layer has iron and the additional element in the ratio of approximately 1:4 and wherein the first magnetic layer has a thickness in the order of 0.001 inch and the second magnetic layer has a thickness in the order of 0.001 to 0.002 inch.

15. A magnetic member, including,
a metallic base member having a first surface uniformly treated in a particular manner,
a thin layer of palladium on the first surface of the metallic base member,
a first deposition of magnetic material on the thin layer of palladium on the base member and including iron molecules and molecules of at least one additional element from the group consisting of nickel and cobalt where the additional element has magnetic properties when deposited with the iron molecules, the first deposition being formed from an electroless plating bath including urea to obtain a deposition in a uniformly thin layer on the base member with enhanced magnetic results, and
a second deposition of magnetic material on the first deposition and including molecules of at least one magnetic element from the group consisting of nickel and cobalt, the second deposition comprising a uniformly thin layer of the magnetic material on the base member with a greater thickness than the thickness of the first magnetic layer, the second deposition having a different magnetic composition than the first deposition.

16. The method set forth in claim 3 wherein the ions of the second magnetic element in the first bath have a concentration of approximately 2:1 by weight relative to the concentration of the ferrous ions in the first bath and wherein the iron ions are obtained from a salt having a weight of approximately 15 grams per liter in the bath.

References Cited by the Examiner

UNITED STATES PATENTS

| | | | |
|---|---|---|---|
| 2,532,283 | 12/1950 | Brenner et al. | 117—50 |
| 2,643,130 | 6/1953 | Kornei | 117—71 X |
| 2,644,787 | 7/1953 | Bonn et al. | |
| 2,691,072 | 10/1954 | Mathes. | |
| 2,704,273 | 3/1955 | Yoshida | 204—51 |
| 2,766,196 | 10/1956 | Yoshida | 204—43 |
| 2,772,183 | 11/1956 | Talmey et al. | 117—50 |
| 2,827,399 | 3/1958 | Eisenberg | 117—130 |
| 2,878,463 | 3/1959 | Austen | 340—174 |
| 2,929,742 | 3/1960 | Minjer et al. | 117—130 |
| 2,941,901 | 6/1960 | Prill et al. | |
| 3,024,134 | 3/1962 | Nixon et al. | 106—1 |
| 3,096,182 | 7/1963 | Berzins | 106—1 |
| 3,098,803 | 7/1963 | Godycki et al. | |
| 3,102,048 | 8/1963 | Gran et al. | |
| 3,110,613 | 11/1963 | Bean | 117—71 |
| 3,116,159 | 12/1963 | Fisher et al. | 117—71 |

FOREIGN PATENTS 749,824  6/1956  Great Britain.

OTHER REFERENCES

"Symposium on Electroless Nickel Plating," ASTM Special Technical Publication No. 265, pages 11, 34, and 36, American Society Testing Materials, Philadelphia, 1959.

TSU et al., IBM Technical Disclosure Bulletin, vol. 4, No. 8, page 52, January, 1962.

BRENNER: "Electroless Plating Comes of Age," Metal Finishing, November, 1954, volume 52 #11, pages 68–76 and December, 1954, volume 52 #12, pages 61–68.

"Symposium on Electroless Nickel Plating," ASTM Special Technical Publication No. 265, pages 10, 11, 34, 35, and 36, American Society for Testing Materials, Philadelphia, 1957.

Brenner et al.: "Deposition of Nickel and Cobalt by Chemical Reduction," Journal of Research of the National Bureau of Standards, Research Paper RP 1835, vol. 39, pages 385–395, November, 1947.

WILLIAM D. MARTIN, *Primary Examiner.*

RICHARD D. NEVIUS, JOSEPH REBOLD, *Examiners.*

F. W. SHERLING, H. W. MYLIUS, H. E. COLE,
*Examiners.*